United States Patent [19]
Elliott

[11] 4,282,598
[45] * Aug. 4, 1981

[54] VIDEO DISC READ BACK SCANNER

[75] Inventor: James E. Elliott, San Pedro, Calif.

[73] Assignee: Discovision Associates, Costa Mesa, Calif.

[*] Notice: The portion of the term of this patent subsequent to Mar. 16, 1993, has been disclaimed.

[21] Appl. No.: 924,538

[22] Filed: Jul. 14, 1978

Related U.S. Application Data

[60] Continuation-in-part of Ser. No. 812,180, Feb. 1, 1977, abandoned, which is a continuation of Ser. No. 662,238, Feb. 27, 1976, abandoned, which is a continuation-in-part of Ser. No. 465,823, May 1, 1974, Pat. No. 3,944,727, which is a division of Ser. No. 299,893, Oct. 24, 1972, Pat. No. 3,829,622.

[51] Int. Cl.³ .................. H04N 5/76; G11B 7/00
[52] U.S. Cl. .................. 369/44; 369/119; 358/128.5; 250/202
[58] Field of Search .......... 358/128, 127, 130, 132, 358/128.5; 179/100.3 V, 100.3 H, 100.3 M, 100.3 E, 100.3 D, 100.3 L, 100.41 L, 100.1 G; 360/77; 365/120, 121; 250/202, 570; 350/285, 299; 346/109, 108, 76 L; 356/399

[56] References Cited

U.S. PATENT DOCUMENTS

| | | | |
|---|---|---|---|
| 3,287,563 | 11/1966 | Clunis | 179/100.3 V |
| 3,363,054 | 1/1968 | Mason | 179/100.32 |
| 3,381,086 | 4/1968 | Moss | 179/100.3 V |
| 3,396,266 | 8/1968 | Max | 365/131 |
| 3,530,258 | 9/1970 | Gregg | 179/100.3 V |
| 3,567,855 | 3/1971 | Hamisch | 179/100.32 |
| 3,612,692 | 10/1971 | Dostal | 350/285 |
| 3,654,624 | 4/1972 | Becker | 346/76 L |
| 3,737,877 | 6/1973 | Feinleib | 346/76 L |
| 3,876,827 | 4/1975 | Janssen | 179/100.32 |
| 3,944,727 | 3/1976 | Elliott | 179/100.3 V |

Primary Examiner—Alan Faber
Attorney, Agent, or Firm—Ronald J. Clark

[57] ABSTRACT

A video signal play back device derives video signals from successive tracks formed as a continuous spiral on a video disc using a light source and a lens system, which is carried by a rotatable element at a predetermined spacing from the surface of the disc and which defines a folded optical path. The rotatable element translates the lens system in the radial direction relative to the disc for "coarse" steering of the light beam along the information tracks as the disc is rotated by a turntable. The optical path includes a mirror which is articulated for rotational motion about an axis which shifts the point of impingement of the transmitted light beam upon the disc in the radial direction. The returned beam is directed to a photosensitive pick-up which provides input signals to a circuit which generates a "fine" servo control signal to drive the articulated mirror.

In an alternative embodiment, a second articulated mirror is included for shifting the point of impingement of the light beam in the tangential direction, along the information tracks, for purposes of time base error correction. The radial position of the first articulatd mirror is monitored to control, with a phase shift equal to one-quarter revolution of the disc, tangential movement of the second articulated mirror.

7 Claims, 3 Drawing Figures

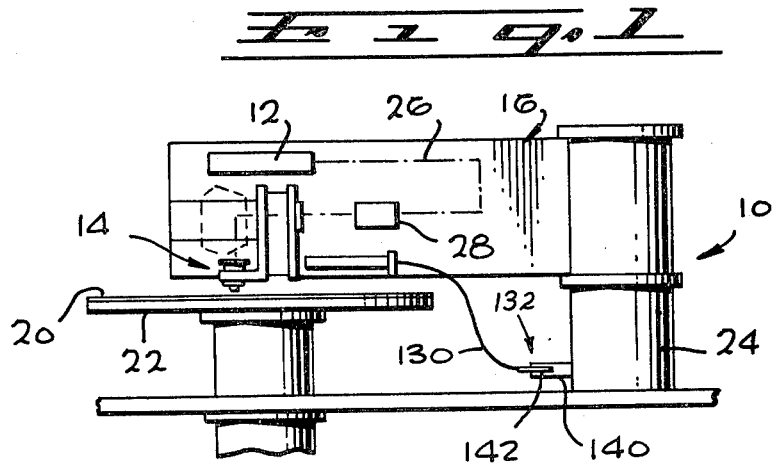
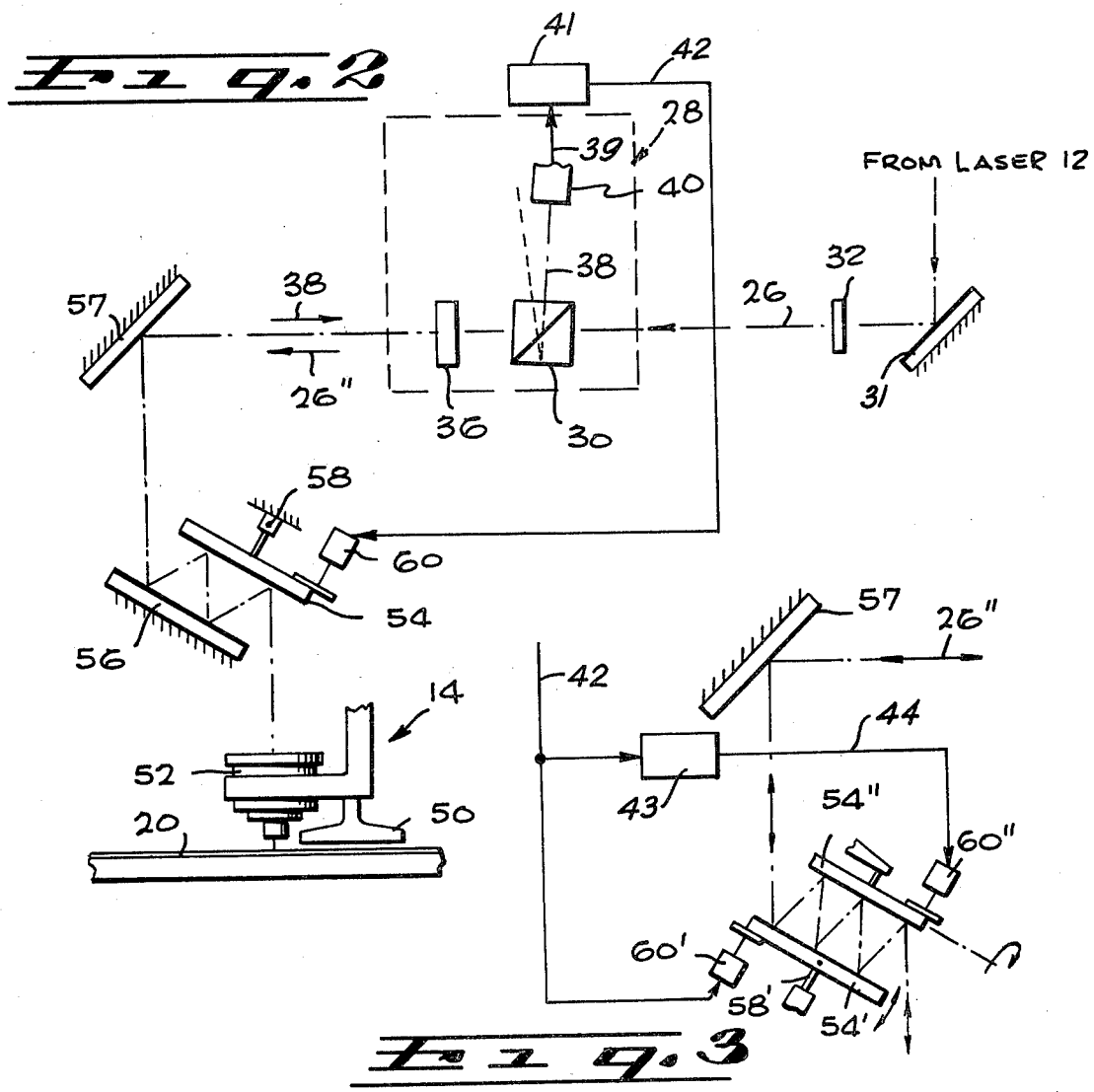

VIDEO DISC READ BACK SCANNER

CROSS-REFERENCES TO RELATED APPLICATIONS

This is a continuation-in-part of a copending application Ser. No. 812,180, filed July 1, 1977 abandoned, which was a continuation of application Ser. No. 662,238, filed Feb. 27, 1976, now abandoned, which was a continuation-in-part of a streamlined divisional application Ser. No. 465,823, filed May 1, 1974, now U.S. Pat. No. 3,944,727, which was divided from application Ser. No. 299,893, filed Oct. 24, 1972, now U.S. Pat. No. 3,829,622. Each of the foregoing applications and issued patents is assigned to the assignee of the present application.

BACKGROUND OF THE INVENTION

1. Field of the Invention

Systems have heretofore been developed for reproducing signals at video frequencies from information recorded on discs, tapes, or other media. Such systems have utilized, among other things, optical recordings upon photosensitive discs, electron beam recording on thermo plastic surfaces and, in prior patents assigned to the assignee of the present invention, systems utilizing a rotating disc which is responsive to impinging radiation to reflect or transmit radiation corresponding to and representative of the information stored on the surface of the disc.

For example, in U.S. Pat. No. 3,530,258, issued to David Paul Gregg and Keith O. Johnson on Sept. 22, 1970, there was shown and described a system in which a video signal transducer included a servo controlled pair of flexible, fibre optic elements. An air bearing supported an objective lens system. A light source of radiant energy was positioned below the disc and the transducer was responsive to transmitted light.

Other patents have shown the use of a radiant source which directed an energy beam to the surface of the disc and provided a transducer that was responsive to reflected energy. One of the major problems to be encountered in the recording and reproduction of video information, arises directly from a consideraton of the energy levels involved in such a process and the restraints imposed by the considerations of size, weight and operating conditions.

To be commercially desirable as a home instrument, the system should be able to store and reproduce a "program" of at least 15 to 30 minutes in length. The record disc should be of an easily handled size, comparable to the phonograph records currently in use. If the playback turntable was operated at 1800 rpm, some 54,000 revolutions would provide 30 minutes of playback. Assuming a 1 micron track width and 1 micron spacing between adjacent tracks, a circular band approximately 4.25 inches wide is required. Assuming that the smallest radius at which information can be stored is approximately three inches, the resultant disc is about 15 inches in diameter. The duration of the program or the speed of the turntable can change the dimensions of the recorded area, as can the width of the individual track and the spacing between adjacent tracks. If narrower tracks are used with a tighter "pitch", the size of the disc can be reduced to approximately 12".

Assuming that the video information has been recorded in some digital fashion, the presence or absence of a signal can be detected at an appropriate information rate. If the width of the track is approximately one micron, and the space between adjacent tracks is also one micron, the quantity of energy necessary to impart information from the disc can be determined. It is necessary to provide sufficient radiant energy to "illuminate" a "spot" of approximately one micron in diameter and, at the same time, provide sufficient radiant energy at the detector, so that the "presence" or "absence" of a signal can be distinguished.

It has been discovered, in attempting to utilize the transmitted radiation techniques of the prior art, that the provision of an inordinately large amount of radiation into the system is required in order to "transmit" a sufficiently useful increment of energy for detection through the record. It has also been determined that a substantial magnification is required to enable a state-of-the-art transducer to respond to a one micron diameter radiant spot.

If a light source illuminates the entire field which can be scanned by the detector under control of the servo system, it will be seen that an extraordinary light intensity must be provided before the light transmitted through or reflected from the disc will be of sufficient intensity to register upon the photosensitive device.

In a preferred embodiment of the present invention, an articulated mirror is utilized with a highly collimated source, to move the point of impingement of the radiant spot upon the disc. An important aspect of the present invention is the ability to direct or "steer" the illuminating radiation to a particular spot and to return the information from the spot thus illuminated to a detector system.

In the preferred embodiment therefore, a single photosensitive pickup is used as one input to a differential amplifier, and a second input is provided from a fixed bias source. The bias is adjusted to balance the input of the photodetector when it is illuminated by the reflected spot that is approximately half way into the information track, for example, on the periphery side of the track. If the intensity of the radiation upon the detector increases in a system where the track is "darker" than the band between "tracks," then a servo signal is developed to drive the mirror in a first direction, tending to move the spot toward the track and toward the center. Similarly, if the radiation decreases, the relatively higher magnitude of the bias causes an error signal to be generated which moves the mirror and the "spot" in a respectively opposite direction, away from the track and toward the periphery.

Since, in the preferred embodiment, one revolution of the disc represents one "frame" of the T.V. picture, an error in tracking, where the track is "lost", merely results in either the skipping or the repeating of a frame, both of which are undetectable by the human observer. In alternative embodiments, it is possible to use the earlier prior art technique of the photodetector pair.

A second, articulated mirror may be provided which rotates in a second direction, orthogonal to the direction used for the radial steering of the beam and tracking of the image. Such steering may be considered to be in the circumferential direction and would aid in the synchronization and timing of the recorded information with respect to the timing frequencies generated in the reproducer circuits. As is known, television circuits, and especially color television circuits, require extremely accurate time synchronization in order to maintain color fidelity. Therefore, any error in synchronism between the local oscillator of the reproduction apparatus and the timing information recorded on the disc, may be resolved and eliminated through the use of mirror motion in the second direction.

It has been found that any errors resulting from eccentricity of the disc can be simply corrected. It will be noted that the steering and tracking circuit which maintains the radiant spot on the appropriate spiral track will undergo some periodic signal fluctuation that is related to eccentricity. It can then be shown that the change in instantaneous velocity in the circumferential direction also changes in substantially similar fashion, but lags by one-quarter revolution of the disc. Therefore, it is possible either to sense the velocity changes from the recorded timing information and from this derive a correcting signal to drive the tracking servos, or to sense the eccentricity from the tracking servo and use that signal with an appropriate phase shift to drive the "timing" servo to correct for velocity changes due to eccentricity. In an alternative embodiment, a single axis articulated mirror corrects for tracking and electronic circuits compensate for timing errors.

An optical system is employed for folding the beam to follow a prescribed folded path within the confines of a defined space, such as a rotatable player element that carries the optical system.

Accordingly, it is an object of the present invention to provide an improved playback assembly for a disc upon which video information has been recorded.

It is yet another object of the invention to provide an improved tracking circuit for optically scanning a video disc.

It is yet another object of the invention to provide an improved scanning assembly for video disc which includes an optical system for directing a highly collimated radiant energy spot to a predetermined location on the disc.

It is yet a different object of the invention to provide a video disc playback assembly which directs a small, well defined radiant spot to the surface of the disc and directs the returning radiation to a photosensitive detector, which detects returning radiation from the disc surface.

The novel features which are believed to be characteristic of the invention, both as to organization and method of operation, together with further objects and advantages thereof will be better understood from the following description considered in connection with the accompanying drawings in which several preferred embodiments of the invention are illustrated by way of example. It is to be expressly understood, however, that the drawings are for the purpose of illustration only and are not intended as a definition of the limits of the invention.

BRIEF DESCRIPTION OF THE DRAWINGS

FIG. 1 is an idealized side view of a playback assembly according to the present invention;

FIG. 2 is a more detailed block diagram of the elements in the optical playback system; and FIG. 3 is an idealized view of an alternative articulated mirror assembly.

DESCRIPTION OF THE PREFERRED EMBODIMENTS

Turning first to FIG. 1, there is shown, in side view a playback assembly 10 suitable for use in the present invention. The playback assembly 10 includes a laser element 12 which moves with the playback assembly 10. It is, however, within the state-of-the-art to provide a stationary laser which is coupled optically to the movable assembly 10. Preferably, the laser 12 provides coherent, polarized light. A read head 14 is mounted in arm 16 of the playback assembly 10.

A video disc, 20, which has video information recorded upon it is mounted on a turntable 22, which is adapted to rotate the disc 20 at a relatively high speed. In the preferred embodiment, the turntable speed is set at 1800 rpm.

Suitable video discs have been described and claimed in the patents to Gregg, Johnson, supra.

The playback assembly 10 is mounted on a rotatable element 24 which, in the view of FIG. 1, translates the reading head in the radial direction relative to the disc 20 and in an arc that is generally orthogonal to the plane of the drawing.

The laser 12 generates a reading beam 26 which generally passes from the laser 12 through an optical system to the playback head 14. The beam is then directed to the surface of the disc 20 and returns through the playback head 14 along the same optical path until a read assembly 28 is encountered. The read assembly 28 is mounted on the arm 16.

The optical system is used to reduce the spot size to the smallest diameter achievable, considering the limitations imposed by diffraction and the wave length of radiation utilized. Increasing the numerical aperture of the objective lens can only improve spot size to the theoretical limit imposed by that wave length. For example, theoretically a HeNe laser could provide a spot having a width of approximately 0.6 microns. For a smaller spot, one would have to select radiation of a shorter wave length.

In operation, the laser directs a reading light beam 26 to the surface of the disc 20 through the optical system. The information recorded upon the disc interacts with the impinging beam and a reflected beam is produced which contains the recorded information. The reflected light beam is returned to the optical system which "analyzes" the returned beam to determine whether the beam is properly tracking the signal channel and supplies an information representing signal, as well.

If the electronics determine that the laser spot is not being directed to a predetermined area of the information channel, appropriate "fine" control servo singals are derived which, when applied to the read head 14, cause the point of impingement of the laser beam to shift in the radial direction to retain alignment with the track that is being read.

In an alternative embodiment, the driver for the rotatable element 24 for the playback assembly 10 can also be controlled by the servo signals which changes the position of the laser spot. In yet another embodiment, a motor can be coupled to the turntable driver to provide a predetermined increment of radial motion for each revolution of the turntable 22. In any case, the playback head 10 can be made to track the information channel recorded on the disc 20 with a "coarse" adjustment being applied to the driver of the rotatable element 24 and a "fine" adjustment being applied to an articulated mirror, described in greater detail below.

As shown in FIG. 1, the reading light beam 26 is directed by the optical system along a folded path between the laser 12 and the surface of the disc 20, thereby reducing the physical separation of these elements relative to the length of the optical path. Specifically, the reading light beam 26 follows a substantially U-shaped path in which it is initially directed by the laser 12 along a first portion of the path parallel to the surface of the disc 20, is deflected along a second portion of the path substantially normal to the first portion of the path, and then is deflected along yet a third portion substantially normal to the second portion, all within the physical confines of the arm 16 to allow for a compact construction of the playback assembly 10. The read assembly 28 is contained in the third portion of the optical path. Finally, the reading light beam is deflected along a fourth portion of the optical path, substantially normal to the surface of the disc 20 and through the playback head 14. Deflection of the reading light beam 26 at any point along its folded path can be accomplished by well known means, such as a fixed mirror 31 shown positioned in the path of the beam (FIG. 2) at the point of deflection between the second and third path portions.

Turning next to FIG. 2, there is shown a diagram of the elements of the reading system. The reading laser beam 26 is shown entering along a segment of the second path portion and being deflected by the fixed mirror 31 along the third path portion to be applied to a beam splitting prism 30. The prism 30 is rotated slightly with respect to the optical path. A lens 32 is provided to better form the beam 26 at the surface 20 and to optimize the resolving power of the system. The transmitted portion of the beam 26 is applied through a quarter wave plate 36 and is then directed through the reading head 14 to the disc.

A returning beam 38 containing the information from the disc 20 follows substantially the identical path. At the quarter wave plate 36, the returning beam is now given an additional quarter wave shift for a total polarization of one-half wavelength. The returning beam 38 reaches the beam splitter 30 and is reflected therefrom to a suitable optical system 40. Light from the laser 12 that is initially reflected in the prism 30 and re-reflected from the base of the prism will, due to the slight rotation of the prism 30, be aimed at a point that wholly misses the detector 40. Moreover, the cumulative effect of the quarter wave plate which polarizes the returning beam by one-half wavelength substantially attenuates any transmitted component. What is transmitted is cross polarized with respect to the laser 12.

The read head 14 includes a fluid-bearing member 50 which is adjacent to and supportive of a microscope objective lens 52. A limited amount of vertical adjustment is available in the objective lens 52. Directing the illumination to the objective lens 52 is an articulated mirror 54 which is mounted adjacent to and cooperates with a second or fixed mirror 56 that is substantially parallel with the articulated mirror 54. The fixed mirror receives the reading beam 26 and directs it to the articulated mirror 54.

The reading beam 26 undergoes at least one reflection from the articulated mirror 54 before the beam is applied to the objective lens 52. Two such reflections are illustrated in the embodiment of FIG. 2. Similarly, the beam path is such that a reflected beam 38 returning from the surface of the disc 20 would also undergo two reflections from the articulated mirror 54 and two reflections from the fixed mirror 56 before proceeding into the optical path including an additional fixed mirror 57, disposed at the point of deflection between the third and fourth path portions, which ultimately leads to the read assembly 28.

In the embodiment illustrated, the articulated mirror 54 is mounted on a point pivot 58 that is centrally located with respect to the mirror 54. The mirror 54 may have an oblong shape with the long axis in the plane of the drawing and the short axis orthogonal to the plane of the drawing. As shown, a mirror driver 60 is connected to one end of the mirror 54 and is operable to impart motion about the central pivot 58.

If the driver 60 rotates the mirror 54 in the clockwise direction, as viewed in FIG. 2, the point of impingement of the read beam 26 will be shifted to the left. This would represent a deflection of the beam in a first radial direction. If the driver 58 rotates the mirror 54 in the counter-clockwise direction, then the point of impingement of the transmitted beam 26 will be shifted to the right, as seen in FIG. 2, or in a second, opposite radial direction.

It will be obvious that the reflected beam 38 and the reading beam 26 trace identical paths between the surface of the disc 20 and the beam splitter 30. The articulated mirror 54 serves to "steer" the reading spot to a desired location and then "reads" only the illuminated area, transmitting that information back to the read assembly 28.

In an alternative embodiment, as shown in FIG. 3, a first articulated mirror 54' is provided which is mounted on a central pivot member 58', and is driven about an axis orthogonal to the plane of the FIGURE and in the clockwise and counter-clockwise direction by a first driver 60' that is coupled to the mirror 54' at the end of a long axis.

A second driver 60" is coupled to one end of a third mirror 54" for imparting rotational motion to the third mirror 54" about the long axis that is in the plane of the FIGURE.

In operation, the first driver 60' permits translation of the beams in the "radial" direction to permit "fine" tracking of the information channel. The second driver 60" is used to translate the beam in the circumferential direction, to provide time synchronization, if desired, and to compensate for eccentricty.

In other embodiments, the problem of time synchronization can be handled mathematically, as a step in the process of electronically compensating for eccentricity of the disc 20 and in such embodiments, only the single articulated mirror is used.

The detector 40 provides an output signal on line 39 to a suitable circuit 41, which generates an error signal over line 42 to the mirror driver 60. The driver 60 is thereby controlled to position the articulated mirror 54 so that the beam 26 will follow information tracks on the disc 20. Suitable detector circuits are described in the parent U.S. Pat. No. 3,829,622 which issued Aug. 13, 1974, and will not be discussed herein.

Control of the third mirror 54" by means of the second mirror driver 60" can be accomplished by noting that deviations of the incremental track area illuminated by the beam 26 in the tangential direction undergo a periodic fluctuation related to eccentricity in the disc 20. These tangential deviations, which can result in time base errors in deriving timing information recorded in the tracks, lag deviations in the radial direction caused by this eccentricity by one-quarter revolution of the disc. Based on this, those of ordinary skill will recognize that a method of controlling the third mirror 54" to correct for tangential deviations is to monitor the radial position of the first mirror 54' and, with a one-quarter phase shift, correspondingly energize the second mirror driver 60'. To this end, the error signal directed over line 41 to the first mirror driver 60' is also fed to a suitable circuit 43 for phase-shifting the error signal before directing it over a line 44 to the second mirror driver 60. In this manner, the radial tracking control system of the present invention can also be utilized to accomplish time base error correction.

It will be apparent from the foregoing that, while particular embodiments of the invention have been illustrated and described, various modifications can be made without departing from the spirit and scope of the invention. Accordingly, it is not intended that the invention be limited, except as by the appended claims.

I claim:

1. A method of controlling a radiant beam in an apparatus for optically reading information from a plurality of substantially concentric information tracks formed in a rotating disc-shaped information storage medium, said apparatus including radiant beam means for producing a source beam of radiant energy and transducer means for receiving a modulated beam of radiant energy produced by impinging said source beam at a selected location upon said storage medium, said method comprising the steps of:

steering said source beam in a radial direction relative to said storage medium to said selected location for following said information tracks;

monitoring the radial location of said source beam relative to said storage medium, and providing a control signal indicative of radial deviations in the location of said source beam from a precisely defined path;

shifting the phase of said control signal by an amount equal to one-quarter revolution of said storage medium; and moving said source beam in a tangential direction relative to said storage medium to said selected location under the control of said phase-shifted control signal.

2. Apparatus for optically reading information indicia stored in a plurality of substantially concentric information tracks formed in a disc-shaped information storage medium, said apparatus comprising:

radiant beam means for producing a source beam of radiant energy to impinge upon the medium;

means for rotating the medium relative to said source beam to produce a modulated beam of radiant energy representing portions of said source beam reflected from the medium;

transducer means for receiving said modulated beam;

optical means, defining an optical path, for directing said source beam from said radiant beam means to the medium and for directing said modulated beam from the medium to said transducer means, said optical means including means for focusing said source beam to a precise spot substantially the size of the information indicia on the medium, and said optical means further including first and second articulated mirrors disposed in said optical path, said first articulated mirror being arranged to steer said source beam in the radial direction relative to the medium and said second articulated mirror being arranged to steer said source beam in the tangential direction relative to the medium;

translation means for translating the medium and said optical means relative to one another to cause the source beam to move from information track to information track in succession across the medium; and control means, responsive to said transducer means, for providing an error signal to said first articulated mirror indicative of radial deviations in the location of said source beam from a precisely selected location relative to an information track, said control means further providing an error signal to said second articulated mirror indicative of tangential deviations in the location of said source beam from a precisely selected location relative to an information track, such that said first articulated mirror and said second articulated mirror controllably guide said source beam along a precisely selected path relative to the information tracks on the medium as the medium and the optical means translate relative to one another.

3. Apparatus for optically reading information indicia stored in a plurality of substantially concentric information tracks formed in a disc-shaped information storage medium, said apparatus comprising:

radiant beam means for producing a source beam of radiant energy to impinge upon the medium;

means for rotating the medium relative to said source beam to produce a modulated beam of radiant energy representing portions of said source beam reflected from the medium;

transducer means for receiving said modulated beam;

optical means, defining an optical path, for directing said source beam from said radiant beam means to the medium and for directing said modulated beam from the medium to said transducer means, said modulated beam and said source beam having at least a portion of said optical path in common, said optical means including means for focusing said source beam to a precise spot substantially the size of the information indicia on the medium, and said optical means further including first and second articulated mirrors disposed in said common portion of said optical path, said first articulated mirror being arranged to steer said source beam in the radial direction relative to the medium and said second articulated mirror being arranged to steer said source beam in the tangential direction relative to the medium;

translation means for translating the medium and said optical means relative to one another to cause the source beam to move from information track to information track in succession across the medium; and control means, responsive to said transducer means, for providing an error signal to said first articulated mirror indicative of radial deviations in the location of said source beam from a precisely selected location relative to an information track, said control means further providing an error signal to said second articulated means indicative of tangential deviations in the location of said source beam from a precisely selected location relative to an information track, such that said first articulated mirror and said second articulated mirror controllably guide said source beam along a precisely selected path relative to the information tracks on the medium as the medium and the optical means translate relative to one another.

4. Apparatus as set forth in claim 3, wherein said optical means includes beam separating means disposed in said common portion of said optical path for separating said modulated beam from the path of said source beam and for directing said modulated beam along a path to said transducer means.

5. Apparatus as set forth in claim 4, wherein said beam separating means comprises a beam splitting prism and a quarter wave plate disposed between said prism and the medium.

6. Apparatus as set forth in claim 5, wherein said beam splitting prism is angularly oriented in said optical path such that portions of said source beam reflected by said beam splitting prism are directed along a path other than the path leading to said transducer means.

7. Apparatus for optically reading information indicia stored in a plurality of substantially concentric information tracks formed in a disc-shaped information storage medium, said apparatus comprising:

radiant beam means for producing a source beam of radiant energy to impinge upon the medium;

means for rotating the medium relative to said source beam to produce a modulated beam of radiant energy representing portions of said source beam reflected from the medium;

transducer means for receiving said modulated beam;

optical means, defining an optical path, for directing said source beam from said radiant beam means to the medium and for directing said modulated beam from the medium to said transducer means, said optical means including means for focusing said source beam to a precise spot substantially the size of the information indicia on the medium and means for steering the source beam along a precisely defined path relative to the information tracks on the medium, said modulated beam and said source beam having at least a portion of said optical path in common, and said optical means further having beam separating means, including a beam splitting prism and a quarter wave plate disposed between said beam splitting prism and the medium, for separating said modulated beam from the path of said source beam and for directing said modulated beam along a path to said transducer means, said beam splitting prism being angularly oriented in said optical path such that portions of said source beam reflected by said beam splitting prism are directed along a path other than the path leading to said transducer means;

translation means for translating the medium and said optical means relative to one another to cause the source beam to move from information track to information track in succession across the medium; and control means, responsive to said transducer means, for providing an error signal to said steering means indicative of deviations in the location of said source beam from said precisely defined path, such that said steering means controllably guides said source beam along said precisely defined path relative to the information tracks on the medium as the medium and the optical means translate relative to one another.

* * * * *